United States Patent [19]

Bacroix

[11] 3,842,659
[45] Oct. 22, 1974

[54] METHOD AND APPARATUS FOR TESTING THE HELIUM TIGHTNESS OF TUBULAR BODIES

[75] Inventor: Marcel Andre Bacroix, Pont-A-Mousson, France

[73] Assignee: Pont-A-Mousson S.A., Nancy, France

[22] Filed: Dec. 29, 1972

[21] Appl. No.: 319,821

[30] Foreign Application Priority Data
Dec. 30, 1971 France............................ 71.47620
Oct. 9, 1972 France............................ 72.35703

[52] U.S. Cl. ................................. 73/40.7, 73/49.5
[51] Int. Cl. ........................................... G01m 3/22
[58] Field of Search .............. 73/40.7, 40, 38, 49.1, 73/49.5; 23/230 L

[56] References Cited
UNITED STATES PATENTS

| | | | |
|---|---|---|---|
| 2,504,530 | 4/1950 | Jacobs | 73/40.7 |
| 2,608,855 | 9/1952 | Jacobs | 73/40.7 |
| 3,487,677 | 1/1970 | Molitor | 73/40.7 |
| 3,520,176 | 7/1970 | Becker | 73/40.7 |
| 3,616,680 | 11/1971 | Schrader | 73/40.7 |

Primary Examiner—Richard C. Queisser
Assistant Examiner—Joseph W. Roskos
Attorney, Agent, or Firm—Sughrue, Rothwell, Mion, Zinn and Macpeak

[57] ABSTRACT

Method and apparatus for testing the helium-tightness of a tubular body.

The method comprises the steps of creating a vacuum inside said body, subjecting each of the points of said body a plurality of times to a flow of helium directed onto the outer surface of the body and, at the same time, isolating, drawing off and accumulating any helium which has passed through the wall of said body, and only this helium, the accumulation being effected at optimum pressure and concentration for detection in a chamber connected to a helium detector, and detecting the accumulated helium.

13 Claims, 16 Drawing Figures

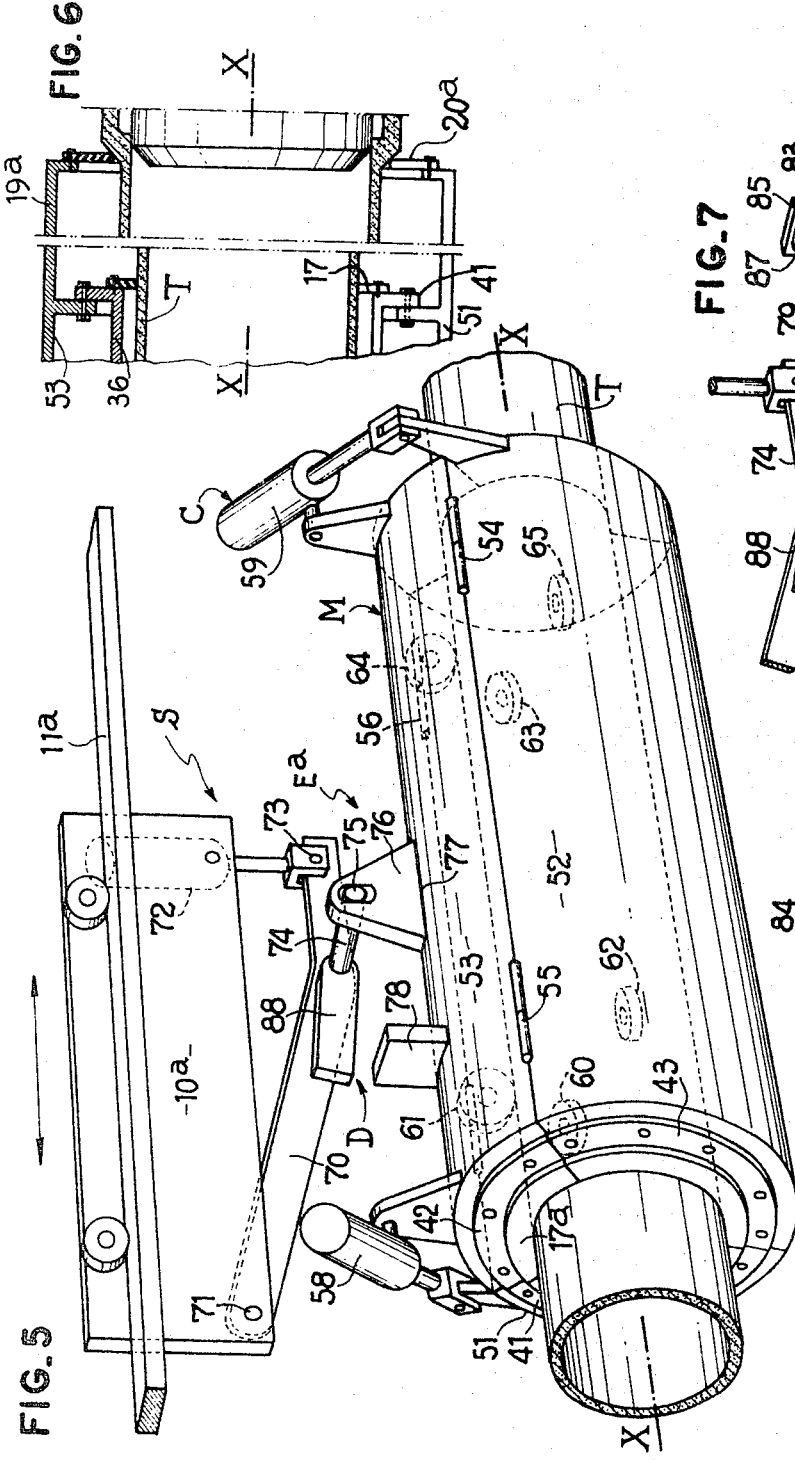

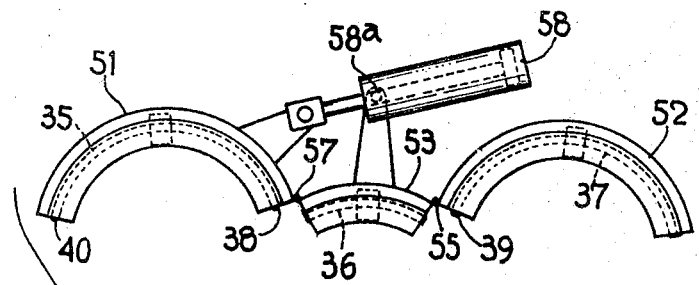
FIG. 9
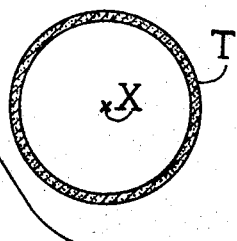
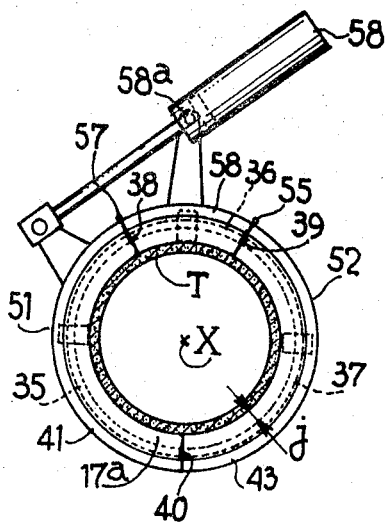
FIG. 10

METHOD AND APPARATUS FOR TESTING THE HELIUM TIGHTNESS OF TUBULAR BODIES

The present invention relates to the testing of tightness with respect to helium of tubular bodies and in particular tubes and pipes for example of cast iron, welded steel, plastics materials, concrete or like materials.

Methods and apparatuses are known which are of a type which permits the testing of the tightness of a wall by employing detectors capable of reacting to a very small quantity or traces of a "tracer" gas, in the present case helium.

In a known type of method applicable to tubular bodies whose wall is capable of withstanding a pressure of the order of 1 bar, a vacuum is created within the enclosure to be tested and an atmosphere enriched with helium is applied to the exterior of the enclosure and the desired testing is effected by collecting any helium which has possibly passed through the tested wall and only this helium. This operation presents in itself a first serious difficulty. A second difficulty resides in the fact that the detector can only operate at very low pressure.

Further, very often, methods of this type were employed in scientific tests where the requirement of safety and/or intrinsic quality of the measurement were far more important than considerations of cheapness and in particular the amount of time spent in the measurement. Now, this is not so in the case of unitary testing of pipes and other like tubular bodies in which the testing must keep up with the pipe or body production rate.

An object of the invention is to provide a method of the aforementioned type for testing the helium-tightness of the wall of pipes or other tubular bodies, wherein, after having created a vacuum in said body, each of its points are subjected a plurality of times to a flow of helium directed onto the exterior of the body and, at the same time, any helium which has passed through the wall of said body, and only this helium, is isolated, drawn off and accumulated at optimum pressure and concentration for detection in a chamber connected to a helium detector and then detected in said chamber.

Another object of the invention is to provide a helium-tightness testing apparatus for carrying out the aforementioned method. This apparatus comprises in combination: a movable annular helium-projecting assembly which is longitudinally slidable along the tubular body to be tested and includes supply means for putting helium in contact with said tubular body and a helium detecting device.

In a particular embodiment of this apparatus, the means comprise a middle annular helium supply region to put the helium in contact with said tubular body and two annular regions adjacent the middle region for drawing off the excess helium which has not been drawn off through the wall of said tubular body.

Helium is in fact very light and, notwithstanding the use of a suction device, when the helium supply means loses contact with the plate of the press which holds the pipe, adjacent the male end of the pipe, if the entrance of the detecting device is disposed in the vicinity of this point there is never certainty of avoiding contamination of this device, which is disadvantageous in respect of the following pipe or pipes which may be consequently wrongly considered to be defective owing to the fact that the movable helium projecting assembly is capable of directly communicating with the helium detecting device. Moreover, the rubber materials employed in the seal between the press and the end of the tested pipe very easily fix the helium at atmospheric pressure.

This is why, in another particular embodiment of the method according to the invention, while the pipe which has just been tested is being replaced by a new pipe, the helium supply means are kept away from the two regions of the ends of the pipes and, in the corresponding apparatus, the movable helium projecting assembly comprises an annular sleeve composed of a plurality of longitudinal sectors articulated to each other. Thus, the movable helium projecting assembly may only come in contact with the press plate, in the vicinity of which the helium detecting device is connected, in the course of the test so that the aforementioned serious drawback is avoided.

Further features and advantages of the invention will be apparent from the ensuing description with reference to the accompanying drawings.

In the drawings:

FIG. 5 is a perspective view of the movable helium projecting assembly of said apparatus in a first embodiment of the device for supporting or suspending the sleeve;

FIG. 6 is a partial diametral sectional view of said assembly in the region of the end of the latter adjacent the socket of the pipe being tested;

FIG. 7 is a partial view similar to FIG. 5 of a second embodiment of the supporting or suspending device of the apparatus shown in FIG. 4;

FIG. 8 is a partial diametral sectional view of the embodiment shown in FIG. 7 at one end of the suspending device;

FIG. 9 is a diagrammatic cross-sectional view of the sleeve in its upper open position above a pipe to be tested;

FIG. 10 is a sectional view similar to FIG. 9, the sleeve being in its lower position closed around a pipe being tested;

Figure 11:
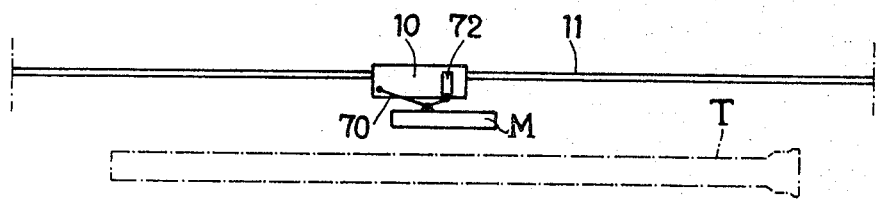
Figure 12:
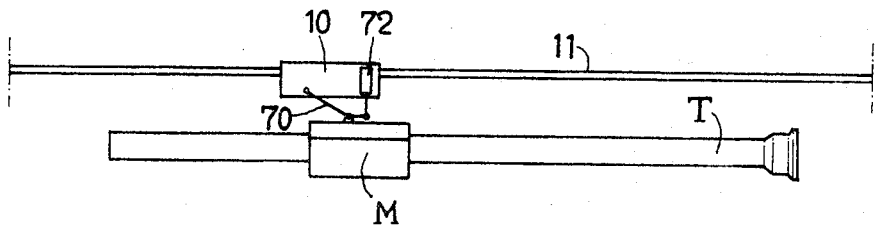
Figure 13:
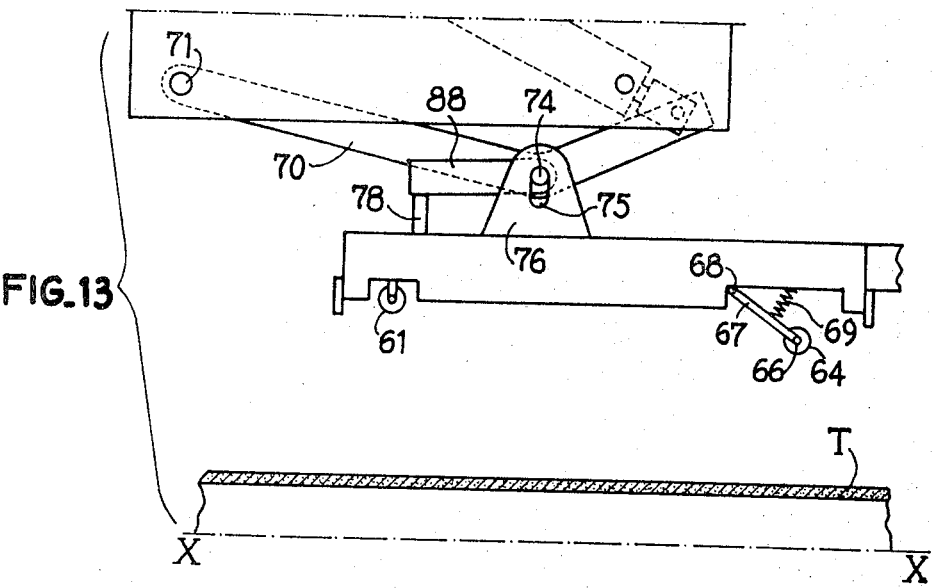
Figure 14:
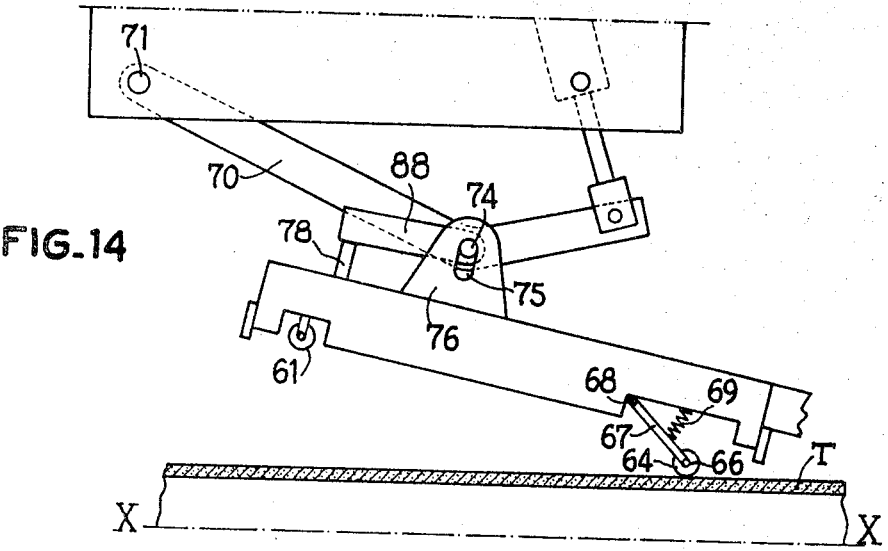

FIGS. 11 and 12 are diagrammatic views of this apparatus respectively in the upper open position and in the lower closed position of the sleeve, and FIGS. 13–16 are partial diagrammatic views of the arrangement of the sleeve supporting or suspending device in the course of the different stages of its descent between its upper open position shown in FIG. 11 and its lower unclosed position which precedes the position shown in FIG. 12.

Figure 1:
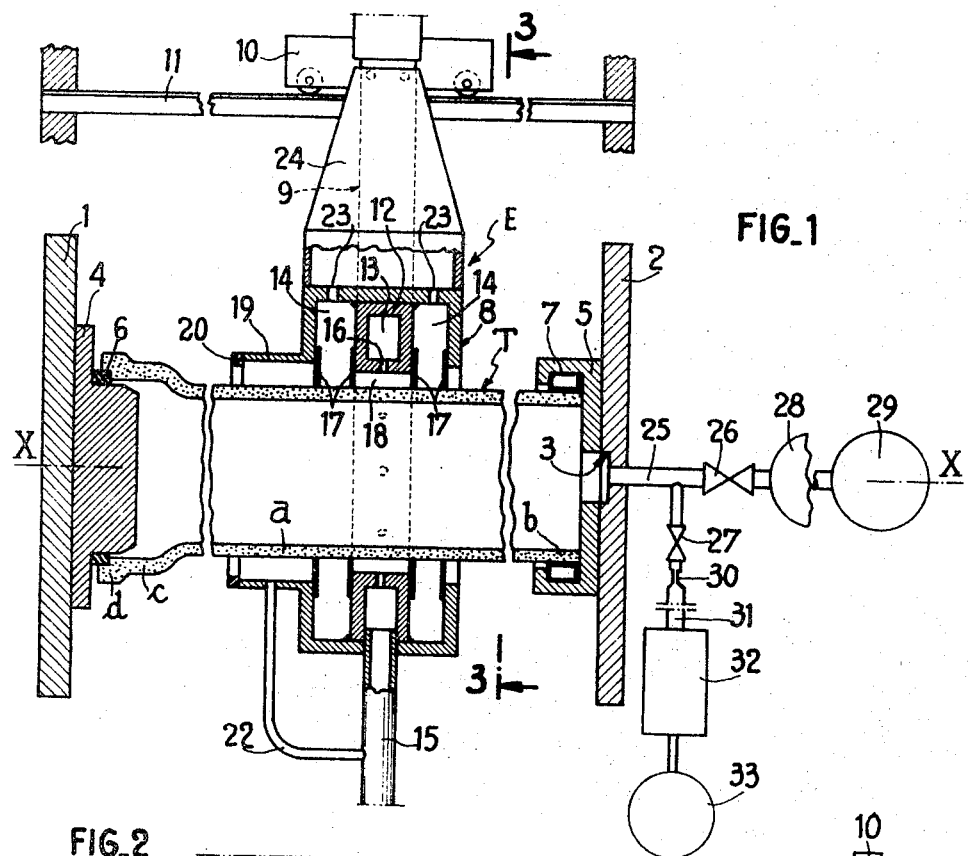
FIG. 1 is a diagrammatic elevational and partial longitudinal sectional view of an apparatus according to the invention.
Figure 2:
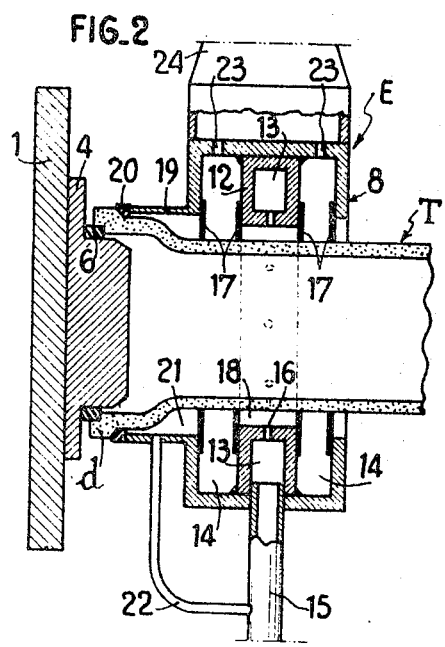
FIG. 2 is a partial similar view of the device according to the invention showing the movable helium projecting assembly in one of its two extreme longitudinal positions.
Figure 3:
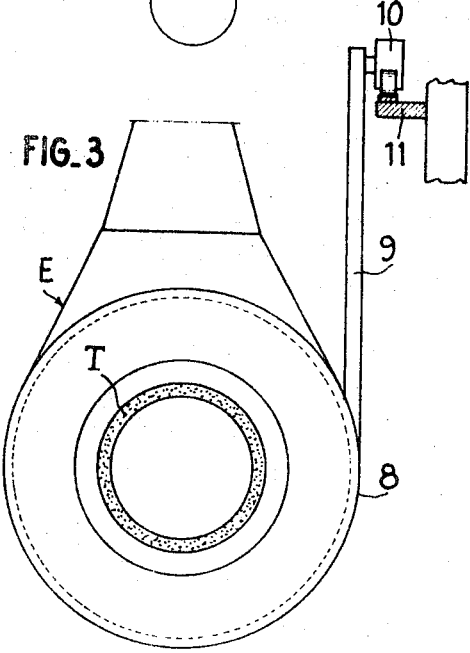
FIG. 3 is a vertical diagrammatic cross-sectional view taken on line 3—3 of FIG. 1.
Figure 4:
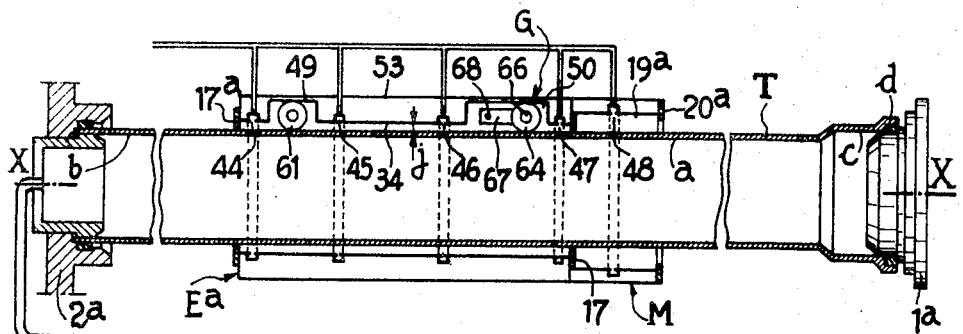
FIG. 4 is a diagrammatic general assembly view, in axial longitudinal section, of an apparatus according to another embodiment of the invention.

The invention is illustrated in FIGS. 1-3 as applied to the testing of the tightness of a pipe T having a cylindrical body *a* terminating in a male end *b* and a socket *c*.

The pipe to be tested is mounted between a movable plate 1 and a fixed plate 2 of a press which has a horizontal axis X—X and is for example located at the output end of a pipe production line. The plate 2 is provided with an orifice 3 for communication with devices described hereinafter for creating a vacuum in the pipe and for the detection. The pipe is maintained between the plates by end members 4 and 5 which are adapted to the plates and have dimensions matching the dimensions of the pipes to be tested. These end members carry sealing elements 6 and 7 which are adapted to be sealingly tight against the end members and the ends of the pipe. They are of butyl rubber or like helium-impervious material. The sealing element 7 adjacent the male end of the pipe is inflatable.

Movable in reciprocating translation along the axis X—X between tne end members 4 and 5 is an assembly E for supplying helium and drawing off excess helium. This assembly comprises a circular box structure which has a U-shape in radial section, is composed of a cylindrical wall and two side walls and permits said reciprocating movement. In the presently described embodiment, the box structure 8 is rigidly secured to a vertical arm 9 (FIGS. 1 and 3) which is integral with a carriage 10 movable on a fixed horizontal rail 11 parallel to the axis X—X by drive means (not shown).

Inside the box structure 8 a hollow rigid ring 12 integral with the box structure defines a middle annular chamber 13 for blowing helium within this ring and two lateral circumferential recesses 14 located on each side of the ring and radially open adjacent the axis X—X and provided for drawing off excess helium.

In the annular helium-blowing chamber 13, opens a helium supply pipe 15 (FIG. 2) integral with the movable assembly E and communicating by way of means (not shown) with a source of helium. The helium supply pressure in the chamber 13 is not critical. It may be, for example, about 0.4 bar. This annular gas supply chamber 13 has a fixed diameter for a range of diameters of pipe T. It opens radially in front of the pipe T by way of a number of orifices 16 provided in its inner wall portion. These orifices have a diameter of about 1 mm and are angularly spaced equal distances apart in the inner wall portion. By way of example only, in the presently described embodiment, designed for testing pipes having a nominal diameter between about 150 and 350 mm, these orifices are advantageously 10 in number.

The two lateral recesses 14 are formed between the radial flange 8 or side walls of the structure 8 and the ring 12. These side walls are provided with rubber flanges 17, namely four flanges, adapted to ensure a seal between the pipe T and, on one hand, a middle annular space 18 with which the orifices 16 communicate and, on the other hand, the two lateral recesses 14. Note that these rubber flanges or washers 17 have an inside diameter exceeding by at least 2 mm the maximum outside diameter of the body part of the pipe to be tested.

The box structure 8 is provided with a cylindrical extension 19 which terminates in an elastically yieldable sealing element 20 which, in the extreme position of the movable assembly E adjacent the socket shown in FIG. 2, is adapted to bear sealingly against the rim or beading $d$ of the pipe socket $c$ and thus constitute a fourth fluidtight chamber 21 which may receive helium by way of a branch pipe 22 connected to the main helium supply pipe 15.

The cylindrical wall of the circular box structure 8 having a U-shaped radial section is provided in its upper part with two apertures 23 in the region of the suction recesses 14 and these apertures open onto a hood 24 provided with suction or exhaust means (not shown) connected to the free air by way of a flexible pipe (not shown).

The assembly E is movable along the pipe T between two extreme positions, namely a first position (FIG. 2) in which the sealing element 20 is applied against the beading $d$ of the pipe socket adjacent the plate 1, and a second position (not shown) in which the right wall of the box structure 8 (as viewed in FIG. 1) is applied against the end member 5 of the fixed plate 2.

In addition to the part described hereinbefore, the apparatus comprises, connected by way of a pipe 25 to the interior of the pipe T through a centre aperture in the plate 2, a pumping part, located downstream of a valve 26, and a measuring part branch-connected upstream of the valve 26 and controlled by another valve 27.

By way of example the apparatus comprises for pumping downstream of the valve 26 a vacuum unit 28 which produces a suction of the order of $10^{-3}$ torr and completes the action of a vane pump 29 connected in series and producing a vacuum of the order of 1 torr.

The measuring part comprises, downstream of the valve 27, a diaphragm 30 constituted by a constriction or a rigid disc provided with an orifice having a diameter of about 4 mm and adapted to separate two regions of different pressures, a cylindrical chamber 31 for accumulating helium and constituted, for example, by a large-section pipe, then a helium detector 32 of known type constituted, for example, by a spectrographic mass analysing apparatus adapted to give an indication of the presence of helium, and a small vacuum pump 33.

The method according to the invention is carried out in the apparatus just described in the following manner:

The pipe T to be tested is placed in position and clamped between the plates 1 and 2. At the end of the travel of the movable plate 1, the sealing element 7 adjacent the male end is inflated.

A vacuum is then created inside the pipe by means of the vane pump 29, the valve 26 being opened, until the pressure descends to 1 torr. At this moment, the relay is taken up by the vacuum unit 28 which completes the vacuum until the pressure is reduced to $10^{-1}$ torr. Meanwhile, the movable assembly E is moved in translation toward the socket end of the pipe T. The valve 26 is then closed so as to isolate the main pumping unit (28,29) from the rest of the apparatus then the valve 27 is opened so as to establish communication between the interior of the pipe and the helium detector 32. The movable assembly E is then made to effect a double sweep along the pipe (two forward and two return strokes) which directs against the wall of the pipe throughout its periphery jets or streams of helium by way of the orifices 16, four times for each point of its surface. At the same time as the movement of the movable assembly E is initiated, the pump 33, which is in permanent operation, draws off in the direction of the detector 32 all the helium which has been captured through the wall of the tested pipe in the course of the two forward and return strokes of the movable assembly E.

If the wall of this pipe has localized micro-cracks, a part of the helium passes through this wall by way of the cracks and the other part of helium in excess in the two recesses 14 is drawn off by way of the hood 24.

If the wall of the pipe has no micro-cracks, the whole of the helium blown by way of the chamber 13 passes through the recesses 14 and is drawn off by way of the hood 24.

The diaphragm 30 and the chamber 31 permit isolating from the interior of the pipe T all the helium received at the detector 32 and accumulating it at a pressure compatible with the good operation of the detector and at the desired concentration of helium before a rise in pressure in the pipe, due to the sweating of the internal wall of this pipe and consecutive to the interruption of the connection to the vacuum-creating pumps 28 and 29, corrupts the atmosphere in this pipe (by sweating is intended the phenomenon according to which the gases occluded in the crusts and diverse oxides of the internal layer of the pipe are released and travel through the porosities when the vacuum has created a sufficient depression in the general cavity of the pipe).

The pressure in the detector 32 may be maintained, owing to the described arrangement, at about $10^{-6}$ torr. In other words, the diaphragm 30 and the chamber 31 maintain the isolation of the detector 32 beyond the time required for measuring, before the effects which are due to the sweating and are disadvantageous for the detector, occur.

It is indeed important that the detector 32 operates under a very extreme vacuum and with a minimum concentration of helium otherwise it gives no indication. The function of the diaphragm 30 is therefore to maintain a large pressure difference between the detector 32 and the enclosure of the pipe T to be tested. Thus, the detector is protected against a possible sweating. The function of the chamber 31 is to retard the equilibrium of the pressures on each side of the diaphragm 30. Its large section enables it to avoid delaying the possible diffusion of the helium of the diaphragm 30 toward the detector 32.

Excellent results have been obtained with a rate of flow of helium of about 80 litres per minute at a pressure of about 0.4 bar, the movable assembly moving at the speed of about 1 metre per second.

Applicant has found that:

Without the combination of the diaphragm 30 and the chamber 31, the detector indicated nothing; in respect of all of the pipes tested including those which in fact have splits or cracks, the detector gives no signal.

Without the diaphragm 30, the detector 32 is not protected from the effects of sweating; without the chamber 31 the detector does not have the required quantity of helium for giving an indication.

Without the movable assembly E which permits separating the helium passing through the wall of the pipe from the helium which does not pass through the wall and discharging the latter, in respect of all of the tested pipes, including the sound pipes, the detector 32 gives a signal indicating cracks.

To summarize, the apparatus according to the invention permits testing the pipes T within a very short period of time suitable for the pipe production rates and indicating if the pipes are sound or not.

It will be understood that in the case of a tubular body without a socket, the extension 19 and the sealing element 20 are dispensed with.

By way of a modification, the apparatus is of course capable of effecting the same helium-tightness test on any enclosure other than a pipe, if certain required adaptations as concerns the socket are made.

In the embodiment shown in FIGS. 4–16, a pipe T with a cylindrical body $a$ terminating in a male end $b$ and a socket $c$ having a beading or rim $d$ is mounted between the two plates $1^a$, $2^a$ of a press having horizontal axis X—X and equipped in the manner described with respect to the structure shown in FIGS. 1–3.

The apparatus comprises essentially a movable helium-projecting assembly $E^a$ which consists of a slidable and articulated sleeve M, a device C for controlling the opening and closing of the sleeve, a guide device G adapted to ensure the rolling of the sleeve along the pipe and a device S for suspending or supporting the sleeve and lowering it into the pipe.

The sleeve M is merely constituted by a cylindrical casing 34 which is coaxial with the press and composed of three longitudinal cylindrical sectors 35, 36 and 37 (FIGS. 8 and 9) which are juxtaposed along three longitudinal sealing lines 38, 39 and 40 along which are disposed sealing elements of neoprene having a section in the form of a musical note alongside each sector. A casing specially dimensioned for each pipe diameter is provided. Indeed, in order to achieve a high concentration of helium while having nonetheless a consumption of helium as low as possible, it is necessary to have a very small clearance $j$ (FIG. 4) between the casing and the pipe. This clearance $j$ must even be markedly less than the permissible deflection or sagging of the pipes. It is in fact this consideration which led to the provision of the guide device G described hereinafter so that the suspending device S is inoperative during the test.

This casing 34 is provided at its ends with outer radial fixing flanges in three parts 41, 42 and 43 which permit bolting the casing to an outer articulated shell, which will be described hereinafter, to the inner edges of which are fixed the rubber radial annular flanges $17^a$ which close, with minimum clearance, the space defined by these flanges around the pipe. The end of this casing 34 located adjacent the socket $c$ of the pipe T carries a cylindrical extension $19^a$ whose diameter is slightly greater than that of the body of the casing and terminates in an inner radial annular flange or end wall $20^a$ of rubber which is adapted to form a seal against the beading $d$ of the socket $c$ when the sleeve is located adjacent the socket $c$ at the end of its travel.

The casing 34 carries four main circular helium-spraying systems 44, 45, 46 and 47 equally spaced apart in radial planes along the casing. An auxiliary circular system 48 is disposed in the same way in the chamber 19 so as to distribute helium thereto. The circular spraying systems are provided with orifices of very small diameter which are evenly spaced apart on the smaller circumference of the systems facing the surface of the pipe to be tested. This cylindrical casing has six cylindrical radial projections which are hollow and have a closed end wall and are arranged in two radial groups of three projections, namely a group 49 near one end of the casing and another group 50 near the other end of the casing. In respect of each of these groups, the axes of these projections pertain to a plane perpendicular to the axis X—X. They are moreover aligned in pairs longitudinally, the common axis of one of these pairs of projections pertaining to the vertical plane of symmetry of the casing and the common axes of the two other pairs being perpendicular to this plane and offset by an angle of 90° to each side of the latter. The projections 49 and 50 contain rollers pertaining to the guide device G described hereinafter. The projection 50 located in the plane of symmetry is not exactly cylindrical but has an oblong section which is elongated along the axis X—X, since the roller it encloses has certain features described hereinafter.

This casing 34 is fixed by its end flanges to an outer cylindrical shell in three parts 51, 52 and 53 the first two parts of which are articulated to the third part by two pairs of hinges 54–55 and 56–57. These shell parts have the shape of cylindrical sectors in the same way as the parts of the casing 54. A single shell is provided for a whole range of pipe diameters to be tested and therefore for a whole range of casings.

The device controlling the opening and closing of the sleeve comprises two hydraulic jacks or cylinder devices 58 and 59 disposed in radial planes at the two ends of the sleeve. These two cylinder devices are actuated by a conventional hydraulic device (not shown) and their cylinders are pivoted to longitudinal pins $58^a$ and $59^a$ integral with the upper shell 53 whereas the rod of the first cylinder device is pivoted to a pin integral with the lateral shell part 51 and the rod of the second cylindrical device is pivoted to a pin integral with the other lateral shell part 52. The upper shell part 53 is moreover integral with the device S for suspending and lowering the sleeve above the pipe described hereinafter.

The guide device G comprises six rollers disposed in two groups of three 60, 61, 62 and 63, 64, 65 in the vicinity of the ends of the sleeve M in the projections 49 and 50 of the casing 34, the rollers 60, 61 and 62 being disposed adjacent the male end b and the rollers 63, 64 and 65 adjacent the socket c. The five rollers other than the central roller 64 contained in the vertical plane of symmetry adjacent the socket are merely freely rotatable on transverse spindles perpendicular to the axis X—X inside the radial projections 49 and 50. These five rollers are mounted on their spindles in such manner as to be capable of rolling along generatrices of the pipe T. For this purpose they are disposed in diametral planes of the sleeve M inside these projections. The roller 64 disposed in the oblong centre projection 50 is rotatably mounted on a transverse spindle 66 carried by a longitudinal arm 67 which is pivoted at its other end to a transverse pin 68 fixed inside the projection 50. A spring 69 biases this arm 67 and the roller 64 thereon away from the inner end of the projection toward the axis of the pipe inwardly beyond the geometric cylinder passing through the inner edge of the end walls $17^a$ so that at the moment of descent of the sleeve onto the pipe, which occurs in an oblique position as will be described hereinafter, the first contact between the sleeve and the pipe occurs through this roller 64. The device S for suspending or supporting and lowering the sleeve onto the pipe comprises the carriage $10^a$ for moving the sleeve in translation and a mechanism D provided for lowering the sleeve. The carriage $10^a$ is movable along a horizontal fixed rail $11^a$ which is parallel to the axis X—X by conventional drive means (not shown).

The lowering mechanism D comprises a longitudinal arm 70 which is pivoted at one end to a transverse spindle 71 integral with the carriage $10^a$ and is movable under the action of a radially disposed hydraulic jack or cylinder device 72 whose cylinder is pivoted to the carriage $10^a$ whereas its piston rod is pivoted to the other end 73 of the arm 70. Th latter carries intermediate its ends a transverse shaft 74 perpendicular to the axis X—X.

In the embodiment shown in FIG. 5, this shaft 74 is journalled in a vertical slot 75 defined by a longitudinal flat bracket 76 which is integral with the upper shell part 53 in a position which is offset with respect to the middle of the shell part toward the side pertaining to the male end b of the pipe. The shell part 53 also carries a flat attached bracket 78 perpendicular to the axis X—X and located with respect to the bracket 76 adjacent the male end b of the pipe.

In the embodiment shown in FIGS. 7 and 8, the shaft 74 is journalled in a longitudinal bar 79 (parallel to the axis X—X) in a position offset with respect to the middle of the latter in a direction away from the socket c of the pipe. As this bar 79 is centered longitudinally on the sleeve, as described hereinafter, the latter, when freely suspended, is out of balance and therefore adopts an oblique position which is downwardly inclined toward the socket c of the pipe. The bar 79 terminates at its two ends in two square portions 80 and 81 one of the diagonals of which is vertical and the other horizontal. These square portions 80 and 81 are disposed in corresponding square openings 82 and 83 defined by two flat members 84 and 85 perpendicular to the axis X—X and integral with the upper shell part 53 in regions in the vicinity of its ends and symmetrical with respect to the radial plane through the centre of gravity of the sleeve. As shown in FIG. 7, the bar 79 carries at both ends square flanges 86 and 87 which are capable of communicating to the sleeve M the longitudinal movement of translation of the carriage $10^a$ by bearing against the members 84 and 85 integral with the shell part 83.

It is of particular interest to note that the angular keying of the square portions 80 and 81 in the square openings 82 and 83 prevents swinging of the movable assembly in the upper position. The operations for transferring the pipes below this assembly can therefore be carried out without danger.

In either embodiment, an auxiliary abutment arm 88 is integral with arm 70 on one side of the latter so as to be capable of coming in contact with the bracket 78 (FIG. 5) or 84 (FIG. 7) when the shell is in the upper position and thus ensuring the rightening of the latter in a generally horizontal position parallel to the axis X—X notwithstanding the imbalance resulting by construction from the choice of the offset attachment of the member 78 to the shell part 53 (FIG. 5) or of the offset position of the shaft 74 on the bar 79 (FIG. 7).

The apparatus just described operates in the following manner:

When a test on a pipe has finished, the movable assembly $E^a$ has returned to the male end of th pipe. This movable assembly $E^a$ is then returned, the sleeve M being in the closed position, to the middle of the pipe (FIGS. 4, 5, 10, 12, 15), the shell is opened by the cylinder devices 58 and 59 and the sleeve M is raised to the upper position and opened (FIG. 9) by following a reverse sequence of operations to that described hereinafter for lowering the sleeve with reference to FIGS. 13–15.

The pipe which has just been tested is then replaced by another pipe T between the plates 1" and 2" of the press. This pipe T is put under a vacuum and simultaneously the sleeve is lowered according to the following sequence of operations illustrated in FIGS. 13, 14, 15 and 16 from its upper position (FIG. 13) in which the arm 70 is adjacent the carriage 10", the arm 88 being in contact with the member 78 and the shaft 74 in the upper position in the slot 75 and which the roller 64 is biased toward the pipe by the spring 69.

Figure 15:
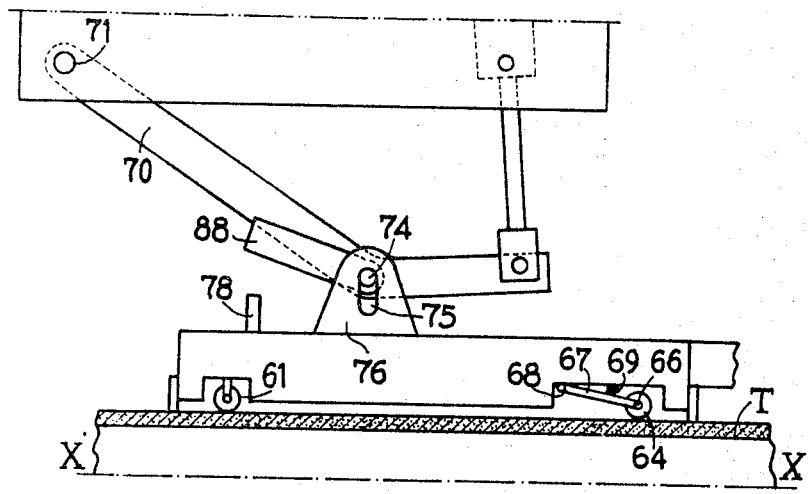
Figure 16:
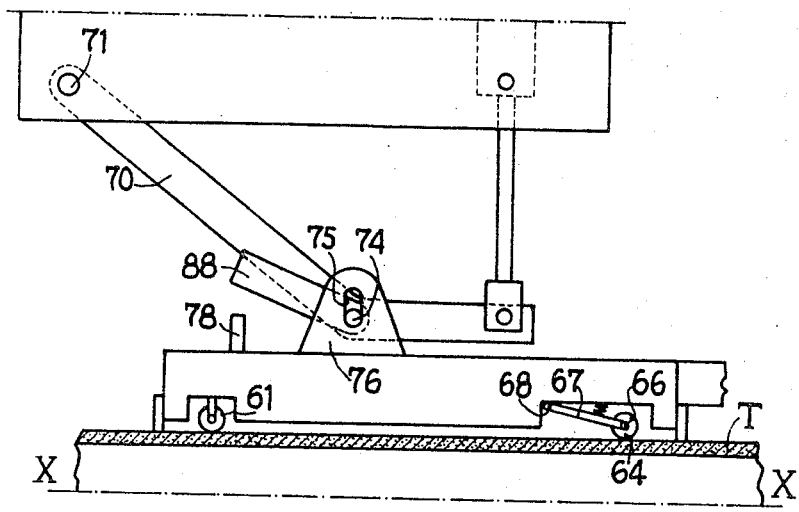

The sleeve is inclined in such manner as to lower the roller 64 into contact with the pipe by a rotation of the arm 70 which is pivoted about the shaft 71 by the cylinder device 72 (FIG. 14), the arm 88 remaining in contact with the member 78 and the shaft 74 in the upper position in the slot 75; the roller 64 is then merely in contact with the pipe, the spring 69 being still extended. The sleeve is continued to be lowered until the roller 61 is made to contact the pipe T under the continued operation of the cylinder device 72 and of the rotation of the arm 70 (FIG. 15). The spring 69 is then compressed under the weight of the sleeve, the arm 88 has left the member 78 but the shaft 74 has remained in the upper position in the slot 75; the sleeve assembly is thus brought to the horizontal position. The suspension of the sleeve M from the carriage 10" is then released in pursuing the action of the cylinder device 72 and the rotation of the arm 70 (FIG. 16); the shaft 74 thus descends to the lower end of the slot 75. In the embodiment shown in FIG. 6, it is the square portions 80 and 81 of the bar 79 which move to the bottom of the square openings 82 and 83. In both cases the sleeve bears on the pipe only through the rollers 60 and 66 and is no longer suspended from the suspension device S.

The sleeve M is then closed by the action of the cylinder devices 58 and 59 and then the sleeve is moved in translation in the direction of the socket c of the pipe under the action of the motor which moves the carriage 10", the latter transmitting its movement to the sleeve M solely by the lateral contact between the shaft 44 integral with the carriage and the slot 75 integral with the sleeve (FIG. 5) or between the flanges 86 and 87 integral with the carriage and the members 84 and 85 integral with the sleeve (FIG. 7). This movement of translation brings the sealing element 20 of the sleeve M in contact with the beading d of the socket c.

when a sufficient degree of vacuum (for example $10^{-3}$ torr in a particular application constructed by the Applicant) has been reached in the pipe T, testing may start and the sleeve is shifted toward the male end of the pipe.

The vacuum is created for example by means of a pumping device similar to that of the first embodiment described with reference to FIGS. 1–3 and comprising a valve 26", a vacuum unit 28" and a vane pump 29", whereas the test is carried out for example by means of a measuring device similar to that of the embodiment shown in FIGS. 1–3 and comprising a valve 27", a diaphragm 30", an accumulation chamber 31", a helium detector 32" and a vacuum pump 33".

The test is finished when the sleeve M reaches the male end and has stayed there for a period of time to allow infiltration of helium if there are any splits or cracks at this end of the pipe. The sleeve is then returned to the middle of the pipe.

The following values given by way of a non-limitative example define the conditions in which the apparatus has been employed in the course of particular applications carried out by the Applicant:

range of pipe diameters: 150–350 mm;
hourly rate: 60 pipes per hour;
helium spraying time at each point: 1 second.

Owing to the improvement brought to the apparatus, the sleeve M is opened when it is sufficiently remote from the sealing elements, carried by the plates of the press and adapted to receive the ends of the pipe being tested, to ensure that there is no fixing of helium on the sealing elements. Likewise, the measuring device is not contaminated by entry of undesirable helium by way of the plate 2" of the testing press adapted to receive the male end, during the exchange and handling of the pipes. Note, moreover, that an excessive consumption of helium is avoided since the clearance between the sleeve and the pipe can be rendered very small owing to the roller mounting.

Having now described my invention what I claim as new and desire to secure by Letters Patent is:

1. A method for testing the heliumtightness of a tubular body of a series of tubular bodies comprising the steps of creating a vacuum inside said body, subjecting said body to a flow of helium directed onto the outer surface of the body by displacing axially of the body an annular helium supply region surrounding the body and, at the same time, drawing off, isolating, and accumulating any helium which has passed through the wall of said body, and only said any helium, the accumulation being effected at optimum pressure and concentration for detection in a chamber connected to a helium detector, and detecting the accumulated helium, the helium supply region being maintained at a distance from the two ends of the tubular body while the tubular body which has just been tested is being replaced by a new tubular body of said series of tubular bodies.

2. A method as claimed in claim 1, comprising moving the helium supply region from an initial position substantially midway between the ends of the tubular body to an end of the tubular body, commencing operations comprising the subjection of the tubular body to the flow of helium, the isolation of the helium which has passed through its wall and the accumulation and detection of the helium which has passed through its wall, said operations being pursued while shifting the helium supply region from the said end of the tubular body to the opposite end of the tubular body, stopping movement of the helium supply region for a given period of time, stopping said operations and returning the helium supply region to said initial position.

3. An apparatus for testing the helium-tightness of a tubular body of a series of tubular bodies, comprising in combination: means for closing opposite ends of said body and means for creating a vacuum inside said body; a movable annular helium-projecting assembly having a longitudinal axis encompassing said body with sufficient clearance between said body and the assembly to permit displacing the assembly longitudinally of said body, helium supply means included in the assembly for putting helium in contact with the outer surface of said body; means for deplacing the assembly longitudinally of said body between two extreme positions adjacent the ends of said body; a helium detecting device, and means putting the detecting device in communication with the interior of said body; and means for precluding the contamination of said body closing means and the vicinity of said closing means by helium when replacing a tested body of said series of bodies by a new body of said series.

4. An apparatus as claimed in claim 3, wherein the vacuum-creating means comprise a unit for creating a vacuum and pipe means putting the unit in communication with the interior of said body, the means for putting the detecting device in communication with the interior of said body comprising second pipe means extending through one of said body end closing means and the following, connected to the second pipe means in series relation in the indicated order: an isolating valve, a diaphgram, a large-section chamber, a helium detector and a unit for creating a high vacuum.

5. An apparatus as claimed in claim 3, wherein the annular assembly comprises an annular box structure having a U-shaped longitudinal radial section, a middle hollow ring which is secured within the box structure and defines therein a centre annular chamber for blowing helium onto the outer surface of said body and for connection to a source of helium, means defining radial orifices in the hollow ring for putting the annular chamber in communication with the outer surface of said body, and two annular recesses constituting suction chambers defined by the annular chamber in the box structure for excess helium, said recesses opening radially onto said axis of the annular assembly and means for putting the recesses in communication with a device for drawing off excess helium.

6. An apparatus as claimed in claim 3, adapted to test a tubular body in the form of a pipe having a socket, wherein the movable assembly comprises an extension means defining an auxiliary annular chamber opening radially onto said axis of the assembly, said auxiliary chamber being adapted to overlap, in one of said extreme positions of said assembly, the socket of said pipe to be tested and means for putting the auxiliary annular chamber in communication with a source of helium.

7. An apparatus for testing the helium-tightness of a tubular body, comprising in combination: means for creating a vacuum inside said body; a movable annular helium-projecting assembly having a longitudinal axis and including supply means for putting helium in contact with the outer surface of said body; means for deplacing the assembly longitudinally of said body between two extreme positions; a helium detecting device, and means putting the detecting device in communication with the interior of said body, the helium supply means comprising a middle annular region for putting the helium in contact with the outer said surface of said body, and two annular regions on each side of said middle region for drawing off excess helium which has not been drawn through the wall of said body.

8. An apparatus for testing the helium-tightness of a tubular body, comprising in combination: means for creating a vacuum inside said body; a movable annular helium-projecting assembly having a longitudinal axis and comprising an annular sleeve structure for encompassing the body, the sleeve structure having a plurality of longitudinally-extending sectors articulated to each other for pivoting about a longitudinally extending axes between a closed position and an opened position to open the sleeve structure and allow the sleeve structure to be moved away from said body and supply means for putting helium in contact with the outer surface of said body; means for displacing the assembly longitudinally of said body between two extreme positions; a helium detecting device, and means putting the detecting device in communication with the interior of said body; a device for suspending the sleeve structure from said means for displacing the assembly; a mechanism for raising the sleeve structure away from the tubular body; and a device controlling the opening and closing of the sectors of the sleeve structure with respect to each other.

9. An apparatus as claimed in claim 8, comprising a device for supporting and rolling the sleeve structure on said body, the suspension device and the sleeve structure constituting two elements of which two elements one is integral with a member, and the other has means defining a substantially vertical slot, the member being substantially vertically movable in the slot.

10. An apparatus for testing the helium-tightness of a tubular body, comprising in combination: means for creating a vacuum inside said body; a movable annular heliumprojecting assembly having a longitudinal axis and comprising an annular sleeve structure for encompassing the body, the sleeve structure having a plurality of longitudinally-extending sectors articulated to each other for pivoting about longitudinally extending axes between a closed position and an opened position to open the sleeve structure and allow the sleeve structure to be moved away from said body and supply means for putting helium in contact with the outer surface of said body; means for displacing the assembly longitudinally of said body between two extreme positions; a helium detecting device, and means putting the detecting device in communication with the interior of said body; a device for suspending the sleeve structure from said means for displacing the assembly; a mechanism for raising the sleeve structure away from the tubular body; and a device controlling the opening and closing of the sectors of the sleeve structure with respect to each other, the sleeve structure having three sectors two of which sectors are articulated on each side of a third sector which is connected to the raising mechanism.

11. An apparatus for testing the helium-tightness of a tubular body, comprising in combination: means for creating a vacuum inside said body; a movable annular helium-projecting assembly having a longitudinal axis and comprising an annular sleeve structure for encompassing the body, the sleeve structure having a plurality of longitudinally extending sectors articulated to each other for pivoting about longitudinally extending axes between a closed position and an opened position to open the sleeve structure and allow the sleeve structure to be moved away from said body and supply means for putting helium in contact with the outer surface of said body; means for displacing the assembly longitudinally of said body between two extreme positions; a helium detecting device, and means putting the detecting device in communication with the interior of said body, the sleeve structure comprising an inner cylindrical casing and an outer cylindrical shell, which casing and shell are defined by said sectors when in said closed position.

12. An apparatus as claimed in claim 11, wherein the casing has portions defining housings and the device for supporting and rolling the sleeve structure on said body comprises rollers mounted in the housings to roll along said body.

13. An apparatus as claimed in claim 12, comprising a device for suspending the sleeve structure from said means for displacing the assembly, the sleeve structure being connected to the suspension device in such manner as to be unbalanced, one of said rollers having the highest position among said rollers and located in an extreme position on the heavier side of the sleeve structure, resiliently yieldable means being associated with said one of said rollers to bias it downwardly of the sleeve structure.

* * * * *